United States Patent
Speranzon et al.

(10) Patent No.: US 11,932,394 B2
(45) Date of Patent: Mar. 19, 2024

(54) SYSTEM AND METHOD FOR LOCALIZATION OF SAFE ZONES IN DENSE DEPTH AND LANDING QUALITY HEATMAPS

(71) Applicant: Honeywell International Inc., Charlotte, NC (US)

(72) Inventors: Alberto Speranzon, Maple Grove, MN (US); Carl A. Dins, Tempe, AZ (US); Naman Rawal, Bengaluru Ka (IN)

(73) Assignee: Honeywell International Inc., Charlotte, NC (US)

( * ) Notice: Subject to any disclaimer, the term of this patent is extended or adjusted under 35 U.S.C. 154(b) by 282 days.

(21) Appl. No.: 17/475,055

(22) Filed: Sep. 14, 2021

(65) Prior Publication Data

US 2023/0081722 A1 Mar. 16, 2023

(51) Int. Cl.
*B64C 39/02* (2023.01)
*G06F 18/23* (2023.01)
(Continued)

(52) U.S. Cl.
CPC ............ *B64C 39/024* (2013.01); *G06F 18/23* (2023.01); *G06N 3/02* (2013.01); *G06T 7/50* (2017.01);
(Continued)

(58) Field of Classification Search
CPC ....... B64C 39/024; B64C 39/02; G06F 18/23; G06N 3/02; G06T 7/50;
(Continued)

(56) References Cited

U.S. PATENT DOCUMENTS 10,402,646 B2   9/2019  Klaus
11,710,255 B2 *  7/2023  Frei ...................... G08G 5/0069
(Continued)

FOREIGN PATENT DOCUMENTS

CN    104408446 B    10/2017
EP    2960887 A2      2/2016
EP    3504661 A1      7/2019

OTHER PUBLICATIONS

"Automatic Safe-Landing-Site Selection for Unmanned Aerial Systems", U.S. Appl. No. 17/076,579, filed Oct. 21, 2020, pp. 1 through 23, Published: US.
(Continued)

*Primary Examiner* — Yonel Beaulieu
(74) *Attorney, Agent, or Firm* — Fogg & Powers LLC (57) ABSTRACT

A system for localization of a safe landing zone comprises at least one image-capture device onboard an aerial vehicle, and an onboard processor coupled to the image-capture device. The processor is operative to execute instructions to perform a method that comprises: receive, from the image-capture device, two or more overlapping images of a landscape underneath the aerial vehicle; generate, based on the overlapping images, a landing zone heatmap of the landscape; identify, based on the landing zone heatmap, one or more regions of the landscape having potential landing zones and obstacles; and determine a location of a safe landing zone using a distance transform of the one or more regions of the landscape. The location of the safe landing zone is in an area within one of the potential landing zones that is farthest from the obstacles. The location of the safe landing zone is then stored in a database.

20 Claims, 6 Drawing Sheets

(51) Int. Cl.
  *G06N 3/02* (2006.01)
  *G06T 7/50* (2017.01)
  *G06V 10/10* (2022.01)
  *G06V 10/75* (2022.01)
  *G06V 20/17* (2022.01)
  *B64U 70/00* (2023.01)
  *B64U 101/30* (2023.01)

(52) U.S. Cl.
  CPC ............ *G06V 10/10* (2022.01); *G06V 10/751* (2022.01); *G06V 20/17* (2022.01); *B64U 70/00* (2023.01); *B64U 2101/30* (2023.01); *B64U 2201/104* (2023.01); *G06T 2207/10028* (2013.01); *G06T 2207/10032* (2013.01); *G06T 2207/20081* (2013.01); *G06T 2207/20084* (2013.01); *G06V 10/16* (2022.01)

(58) Field of Classification Search
  CPC . G06T 2207/10028; G06T 2207/10032; G06T 2207/20081; G06T 2207/20084; G06T 5/50; G06T 7/30; G06V 10/10; G06V 10/751; G06V 20/17; G06V 10/16; B64U 70/00; B64U 2101/30; B64U 2201/104; G08G 5/0069; G08G 5/0086; G08G 5/025; G08G 5/0056; G01S 17/89
  See application file for complete search history.

(56) References Cited

U.S. PATENT DOCUMENTS

| | | |
|---|---|---|
| 2013/0282208 A1 | 10/2013 | Mendez-Rodriguez et al. |
| 2017/0090271 A1 | 3/2017 | Harris et al. |
| 2018/0109767 A1* | 4/2018 | Li ........................... H04N 5/33 |
| 2019/0227172 A1* | 7/2019 | Schaefer ............... G06T 3/4053 |
| 2019/0248487 A1 | 8/2019 | Holtz et al. |
| 2022/0292827 A1* | 9/2022 | Chen ................... G06F 16/7867 |

OTHER PUBLICATIONS

Castellano et al., "Crowd Detection in Aerial Images using Spatial Graphs and Fully-Convolutional Neural Networks", IEEE Access, Apr. 2020, pp. 1 through 11.
Symeonidis et al., "Vision-based UAV Safe Landing exploiting Lightweight Deep Neural Networks", International Conference on Image and Graphics Processing (ICIGP), Jan. 2021, pp. 1 through 10.
European Patent Office, "Extended European Search Report", from EP Application No. 22192122.4, from Foreign Counterpart to U.S. Appl. No. 17/475,055, dated Feb. 9, 2023, pp. 1 through 11, Published: EP.
Guo et al., "A Robust UAV Landing Site Detection System Using Mid-level Discriminative Patches", 2016 23rd International Conference on Pattern Recognition (ICPR), Cancun, Mexico, Dec. 4-8, 2016, pp. 1659 through 1664.
Hinzmann, et al., "Free LSD: Prior-Free Visual Landing Site Detection for Autonomous Planes", IEEE Robotics and Automation Letters, Jul. 2018, vol. 3, No. 3, pp. 2545 through 2552.

* cited by examiner

SYSTEM AND METHOD FOR LOCALIZATION OF SAFE ZONES IN DENSE DEPTH AND LANDING QUALITY HEATMAPS

BACKGROUND

Adding autonomous features into aerial vehicles brings the challenges of dealing with off-nominal or emergency situations. During a mission, if an autonomous aerial vehicle runs into a fault or an emergency, such as insufficient power or a critical failure, the best course of action is to land at the nearest safe location or attempt a crash landing in an area that minimizes loss of life and property. Often, these locations are not predetermined since the nature of emergency may not allow the vehicle to use a nearby airport or a heliport/vertiport. In such situations, a human pilot would be well suited to find a region that can be used as an emergency runway or an emergency heliport/vertiport; for example, a wide highway or a flat open field. For an autonomous aerial vehicle, this scenario poses a difficult challenge since the vehicle has to have enough capabilities to perceive its environment and determine a safe landing zone before proceeding for landing.

Determination of an emergency landing zone in any terrain/region requires information about depth and semantic understanding of the scene in real time, especially to find dynamic objects that would need to be avoided before proceeding to land. Static information about terrain and semantics, such as buildings, highways, etc., can be obtained through pre-recorded databases. While dynamic information can be obtained through various sensors, such light detection and ranging (LiDAR), radar, and camera devices on the vehicle, such information is very raw and requires various kinds of perception algorithms to make sense of the input data and find a safe region to proceed for landing.

SUMMARY

A system and method for localization of safe landing zones is provided. The system comprises at least one image-capture device onboard an aerial vehicle, and at least one processor onboard the aerial vehicle and operatively coupled to the image-capture device. The processor is operative to execute instructions to perform a method that comprises: receive, from the image-capture device, two or more overlapping images of a landscape underneath the aerial vehicle; generate, based on the overlapping images, a landing zone heatmap of the landscape; identify, based on the landing zone heatmap, one or more regions of the landscape having one or more potential landing zones and obstacles; and determine a location of a safe landing zone using a distance transform of the one or more regions of the landscape. The location of the safe landing zone is in an area within one of the potential landing zones that is farthest from the obstacles. The location of the safe landing zone is then stored in a database.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method for localization of safe landing zones using dense depth and landing quality heatmaps is described herein. The present approach provides for using several algorithms to find a safe landing zone for an autonomous aerial vehicle with more reliability.

The system allows for real-time determination of potential emergency landing zones as a vehicle flies over terrain data not in the training set of algorithms. These landing zones can then be queried and used for landing in case of an emergency when it is not possible to reach predetermined landing zones.

While there are various methods to determine depth and semantic information of a camera scene, methods to evaluate landing quality of a scene only produce a pixel-level heatmap. Determination of a landing zone or a target for landing guidance requires further analysis with computational geometry algorithms and morphological operations. The present system utilizes one or more sensors and processing units that can host the necessary processing algorithms, and interact with a guidance and control system to proceed with a safe landing.

The present approach is intended to solve the problem of identifying an emergency landing region in real time, by making use of several perception pipelines such as semantic segmentation and depth estimation, which is then further processed to generate a landing zone quality map. This quality map or heat map is then passed through computational geometry-based algorithms to determine "safe" zones/regions. These regions are then further localized in three-dimensional (3D) coordinate frames for guidance. The present system achieves this by making use of a camera and an inertial navigation source.

The present approach is applicable for providing an emergency safety feature in autonomous aerial operations of unmanned aerial systems and urban aerial mobility (UAM) services. This allows single pilot operations and fully autonomous operations to be more widely accepted, with the added safety feature of emergency landing. Various service providers can then save cost on training and paying the pilots, as the UAM industry scales up with more and more vehicles in the urban air space. The features in the present system allow for handling off-nominal situations, especially emergency situations, safely and reliably. Due to logistics and regulation constraints, it would be difficult to scale UAM operations to Beyond Visual Line of Sight without having an emergency landing feature that allows the vehicle to determine a safe landing zone in real time, and provide autonomous landing guidance to avoid an imminent crash or accident.

In addition, the features of the present system and method can be implemented for use in various manned aerial systems, which can make use of these features in case of an emergency.

In one aspect, the present system utilizes a post processing algorithm that allows for the determination of safe landing zones with more reliability. The post processing algorithm uses morphological operations and computational geometry over pixels and 3D voxels to determine locations that are farthest from obstacles detected by an upstream perception pipeline. These operations attempt to isolate solids objects or blobs of obstacles, and calculate distances of open space pixels/voxels from these obstacles. The open spaces are characterized by geometric and semantic information encoded in a pixel heatmap depicting landing quality. The detected safe zones are then localized using navigation data and stored in an onboard database. The database can be queried in real-time in case of an emergency situation based on its nature, such as high winds/gusts, state of charge or system/subsystem failure.

The onboard system can determine parameters such as expected quality of the landing zone, for example, degree of roughness/flatness, slope, size, and distance from the current location, to find the best possible landing location. An autopilot onboard the vehicle then simply guides the vehicle to the landing location determined as per the prescribed regulations.

Further details of the present system and method are described as follows and with reference to the drawings.

Figure 1:
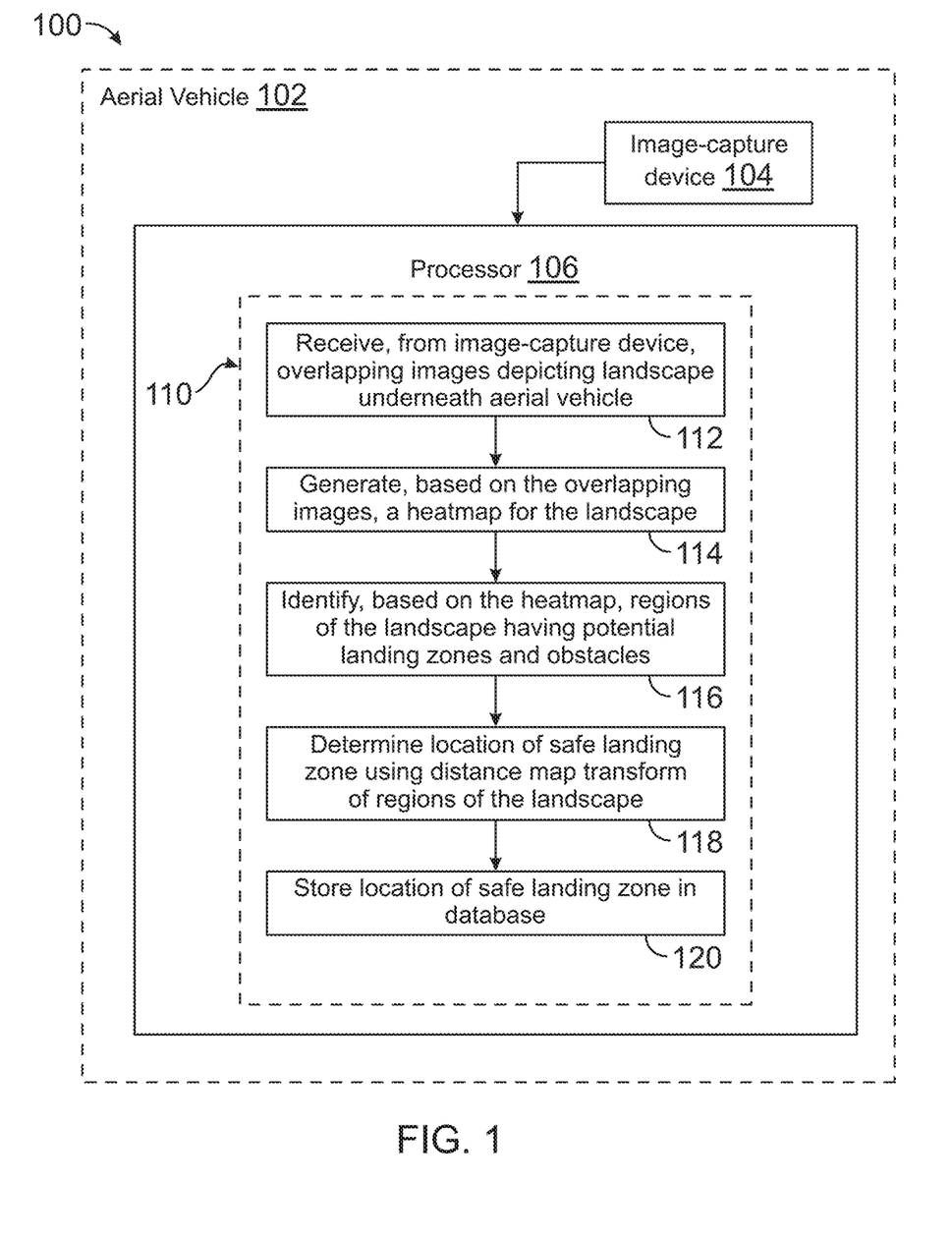
FIG. 1 is a block diagram of a system for providing localization of a safe landing zone for an aerial vehicle, according to one embodiment.

FIG. 1 is a block diagram of a system 100 for providing localization of a safe landing zone for an aerial vehicle 102, according to one embodiment. The aerial vehicle 102 can be an unmanned aerial vehicle (UAV), UAM vehicle, unmanned aircraft system (UAS), or the like, which employs a visual navigation system. The aerial vehicle 102 has at least one image-capture device 104 mounted thereon, such as a machine vision camera, which is operative to capture images of an area over which aerial vehicle 102 traverses. The aerial vehicle 102 includes at least one processor 106 operatively coupled to image-capture device 104.

The processor 106 is operative to perform a method 110 for localization of a safe landing zone for aerial vehicle 102. The method 110 generally includes the following steps, which are described in further detail hereafter. The method 110 begins with receiving, from image-capture device 104, two or more overlapping images depicting a landscape underneath aerial vehicle 102 (block 112). The method 110 then generates, based on the two or more overlapping images, a heatmap for the landscape (block 114). The method 110 identifies, based on the heatmap, one or more regions of the landscape having one or more potential landing zones and obstacles (block 116). The method 110 then determines a location of a safe landing zone using a distance map transform of the one or more regions of the landscape (block 118). The location of the safe landing zone is in an area within one of the potential landing zones that is farthest from the obstacles. Finally, method 110 stores the location of the safe landing zone in a database (block 120). The location of the safe landing zone is then available as needed for an emergency landing of aerial vehicle 102.

Figure 2:
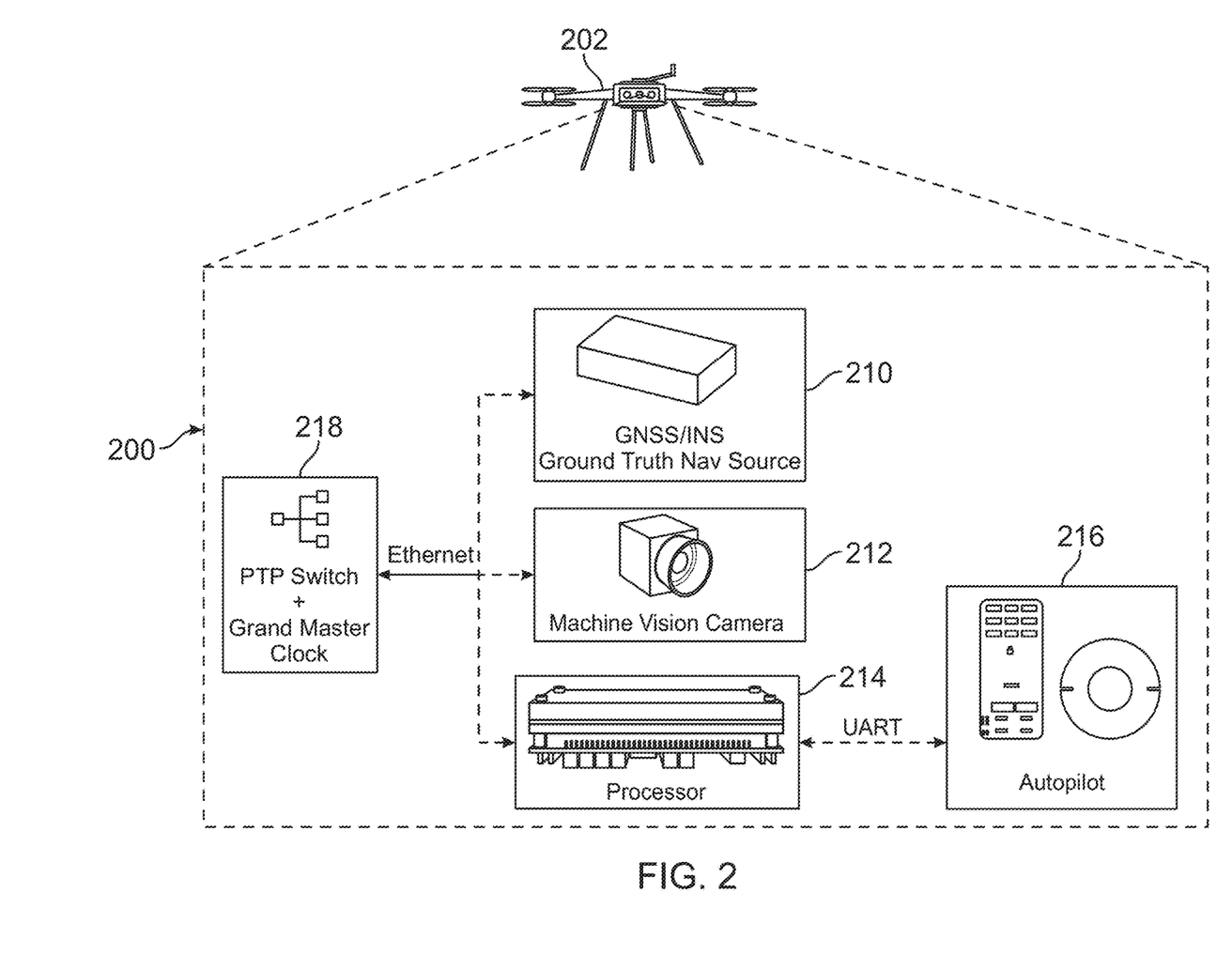
FIG. 2 is a block diagram of an onboard system for an aerial vehicle, according to an exemplary embodiment, which can be implemented to provide localization of a safe landing zone.

FIG. 2 is a block diagram of an onboard system 200, according to an exemplary embodiment, which can be implemented to provide localization of a safe landing zone for an aerial vehicle 202, which can be a UAV, UAM, UAS, or the like. The onboard system 200 includes a ground truth navigation source, such as an onboard Global Navigation Satellite System (GNSS)/Inertial Navigation System (INS) navigator 210. In some embodiments, GNSS/INS navigator 210 can be fused with other alternative systems, such as camera, LiDAR, or radar based position, velocity, and attitude estimation systems.

An onboard machine vision camera 212 is operatively coupled to GNSS/INS navigator 210, and is operative to capture real-time images from aerial vehicle 202. An onboard processor 214 is operatively coupled to GNSS/INS navigator 210 and to machine vision camera 212. The processor 214 is configured to host a neural network and machine vision algorithms, and to interface with other onboard peripheral systems.

An autopilot 216 is operatively coupled to processor 214, and is configured to listen to guidance commands and control aerial vehicle 202. The autopilot 216 can be coupled to processor 214 through a Universal Asynchronous Receiver/Transmitter (DART), which is operative receive and transmit serial data. A Precision Time Protocol (PTP) switch and clock 218 is operatively coupled to GNSS/INS navigator 210, machine vision camera 212, and processor 214, through an Ethernet connection. The PTP switch provides for time synchronization between all onboard systems, which is required to ensure the coherence between the detected landing zones and the navigation source.

Figure 3:
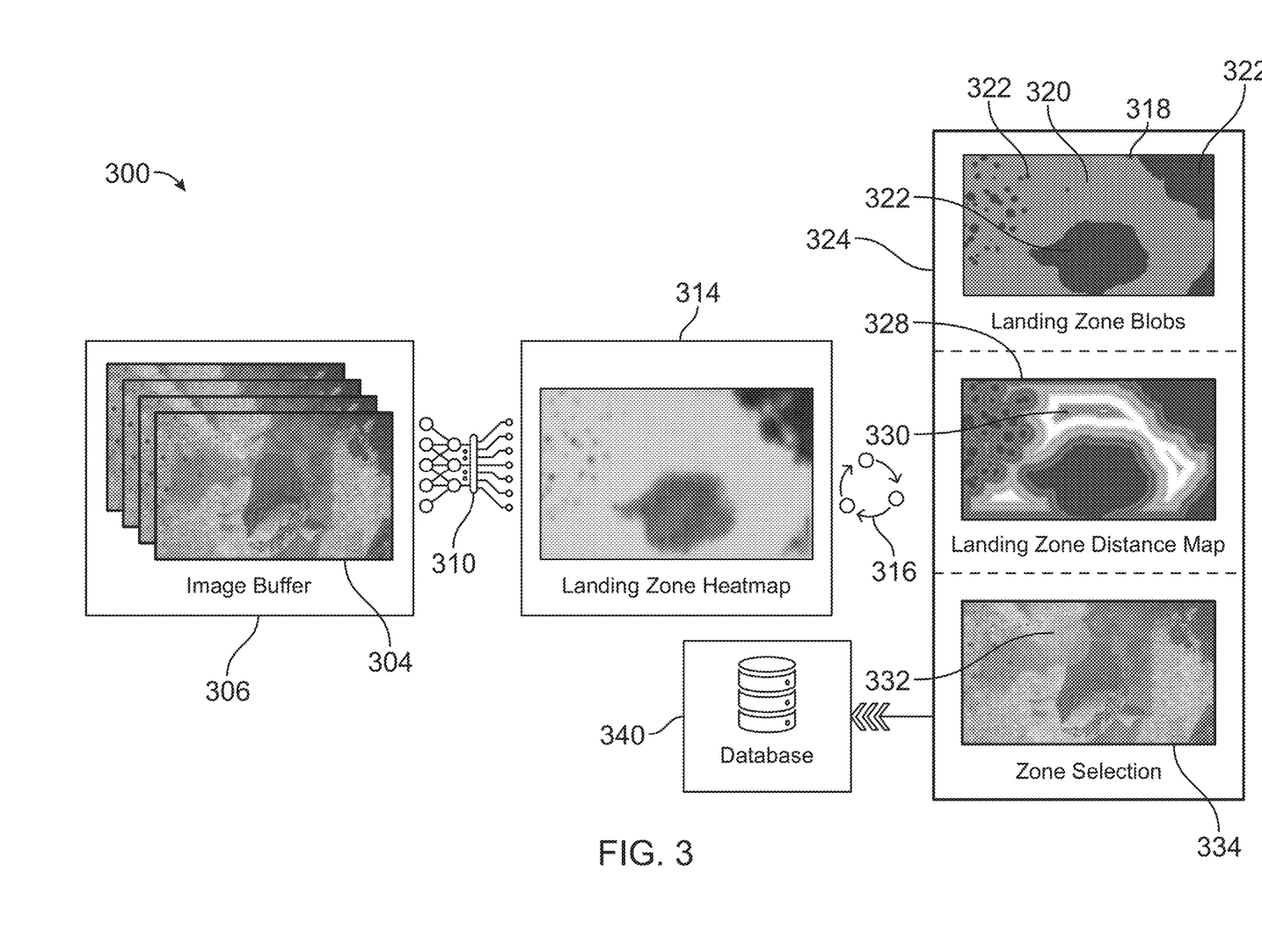
FIG. 3 is a flow diagram of an exemplary method for providing localization of a safe landing zone for an aerial vehicle.

FIG. 3 is a flow diagram of an exemplary method 300 for providing localization of a safe landing zone for an aerial vehicle, such as a UAV, UAM, UAS, or the like. The aerial vehicle has at least one machine vision camera mounted thereon, which is operative to capture, in real-time, a set of images 304 that are added to an image buffer 306. The set of images 304 include overlapping images of a landscape underneath the aerial vehicle. The set of images 304 are fed to a deep neural network 310, which is hosted in an onboard processor. The deep neural network 310 is configured to compute and generate a landing score/zone heatmap 314. The heatmap 314 is processed at 316 to generate a binary mask 318, which is labelled with landing zone blobs 320 and other objects 322 for post processing at 324. The safest landing spot is then calculated using a distance map transform of binary mask 318. This produces a landing zone distance map 328 showing a safest point 330 for landing. A landing spot 332 is then detected and selected based on safest point 330 of landing zone distance map 328. The landing spot 332 is shown in zone selection image 334. The location of landing spot 332 is then stored in a database 340, in case of an emergency.

Figure 4:
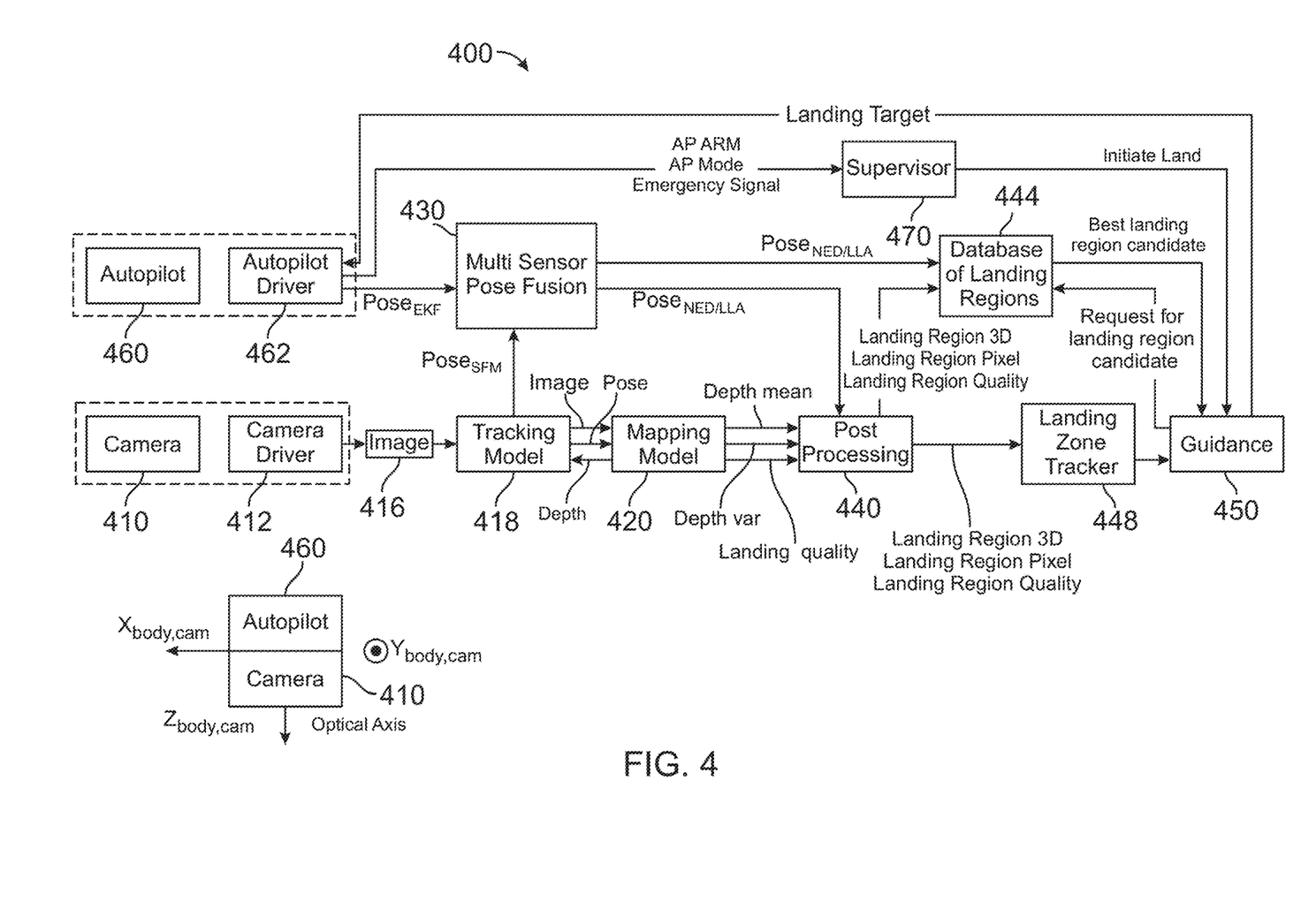
FIG. 4 is a block diagram of an onboard system architecture for an aerial vehicle, according to one embodiment, which is operative to provide localization of a safe landing zone.

FIG. 4 is a block diagram of an onboard system architecture 400 for an aerial vehicle, according to one embodiment, which is operative to provide localization of a safe landing zone. The system architecture 400 includes a camera 410 that operates with a camera driver 412, which is configured to send image information 416 from camera 410 to a tracking model 418. The tracking model 418 is operatively coupled to a mapping model 420 and a multi-sensor pose fusion module 430. The tracking model 418 provides image and pose information to mapping model 420, which in turn provides depth information back to tracking model 418. The mapping model 420 generates a pixelwise depth map and a landing quality pixel map. The landing quality pixel map incorporates the depth map information with other semantic data.

A post processing module 440 is operatively coupled to mapping model 420. The post processing module 440 is configured to calculate potential landing regions based on information from mapping model 420, including one or more the landing quality pixel maps. The multi-sensor pose fusion module 430 is configured to receive pose information (Pose$_{SFM}$) from tracking model 418, and estimate vehicle state data comprising data regarding the six degrees of freedom (Pose: 6DOF), including 3D rotation and 3D translation. The multi-sensor pose fusion module 430 is configured to output the vehicle state data (Pose$_{NED/LLA}$) to post processing module 440.

A database of landing regions 444 is operatively coupled to post processing module 440 and multi-sensor pose fusion module 430. A landing zone tracker 448 is operatively coupled to post processing module 440. During operation, one or more potential landing regions is projected in 3D using a camera projection matrix and the depth map in post processing module 440. The potential landing regions can then be stored for a future emergency in database of landing regions 444, or can be used in real time with landing zone tracker 448.

A guidance module 450 is operatively coupled to database of landing regions 444 and landing zone tracker 448. The guidance module 450 is operative to send a request to database of landing regions 444 for a landing region candidate. The best landing region candidate is then sent from database of landing regions 444 to guidance module 450.

The system architecture 400 also includes an autopilot 460 that operates with an autopilot driver 462, which is operatively coupled to multi-sensor pose fusion module 430. The autopilot 460 is configured to receive guidance commands, including landing target information, from guidance module 450 through autopilot driver 462. The autopilot 460 is configured to send various commands (AP ARM, AP Mode, emergency signal) to a supervisor module 470, which is operative to send an initiate land command to guidance module 450. The autopilot 460 is also configured to send pose commands (Pose$_{EKF}$) to multi-sensor pose fusion module 430.

As shown in FIG. 4, camera 410 and autopilot 460 are oriented on the body of the aerial vehicle in an X-Y-Z coordinate system, such that the optical axis of camera 410 is pointed along the Z-direction.

Figure 5A:
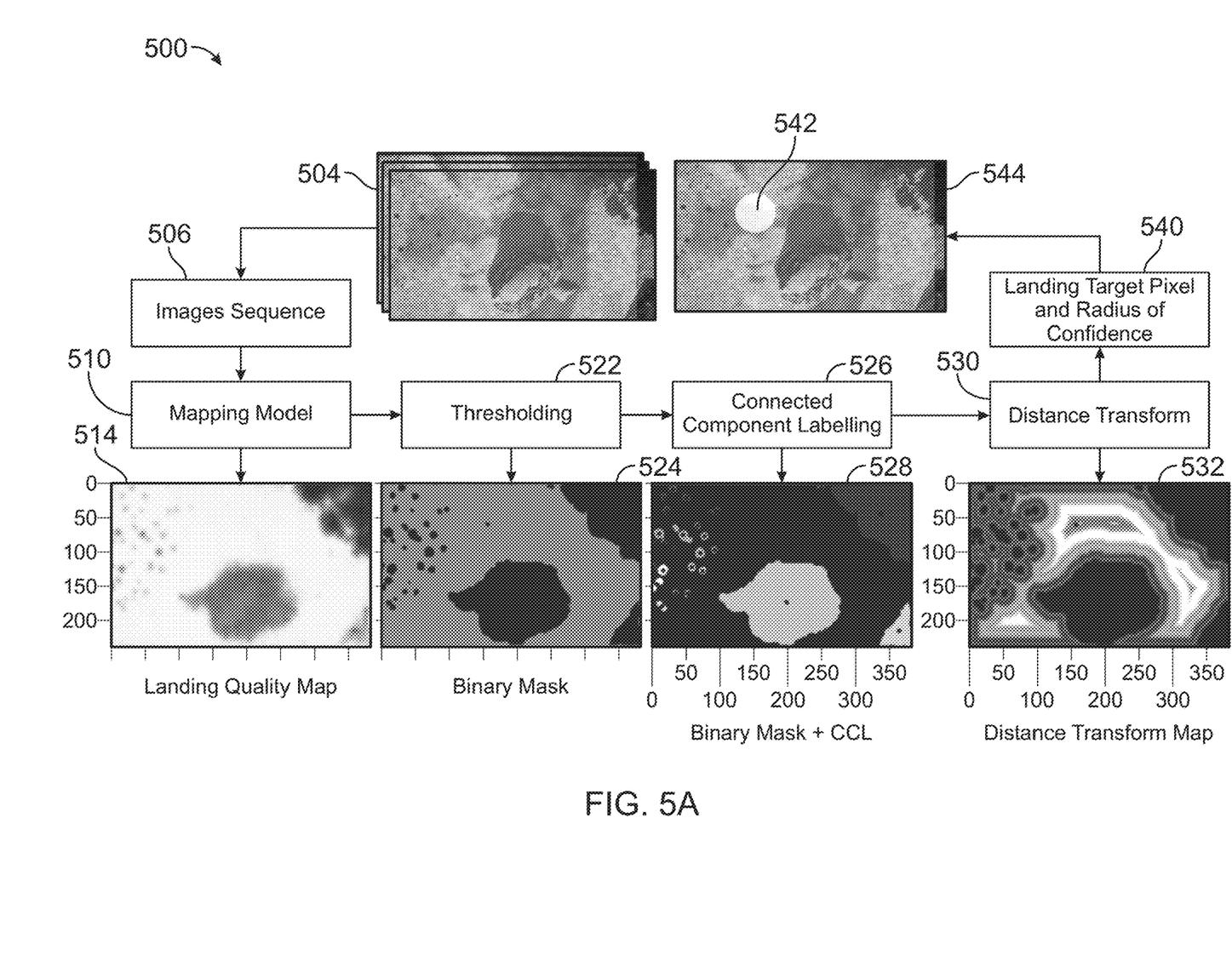
FIG. 5A is a flow diagram of an exemplary method for post processing, illustrating various aspects of how a safe landing zone identification is performed.
Figure 5B:
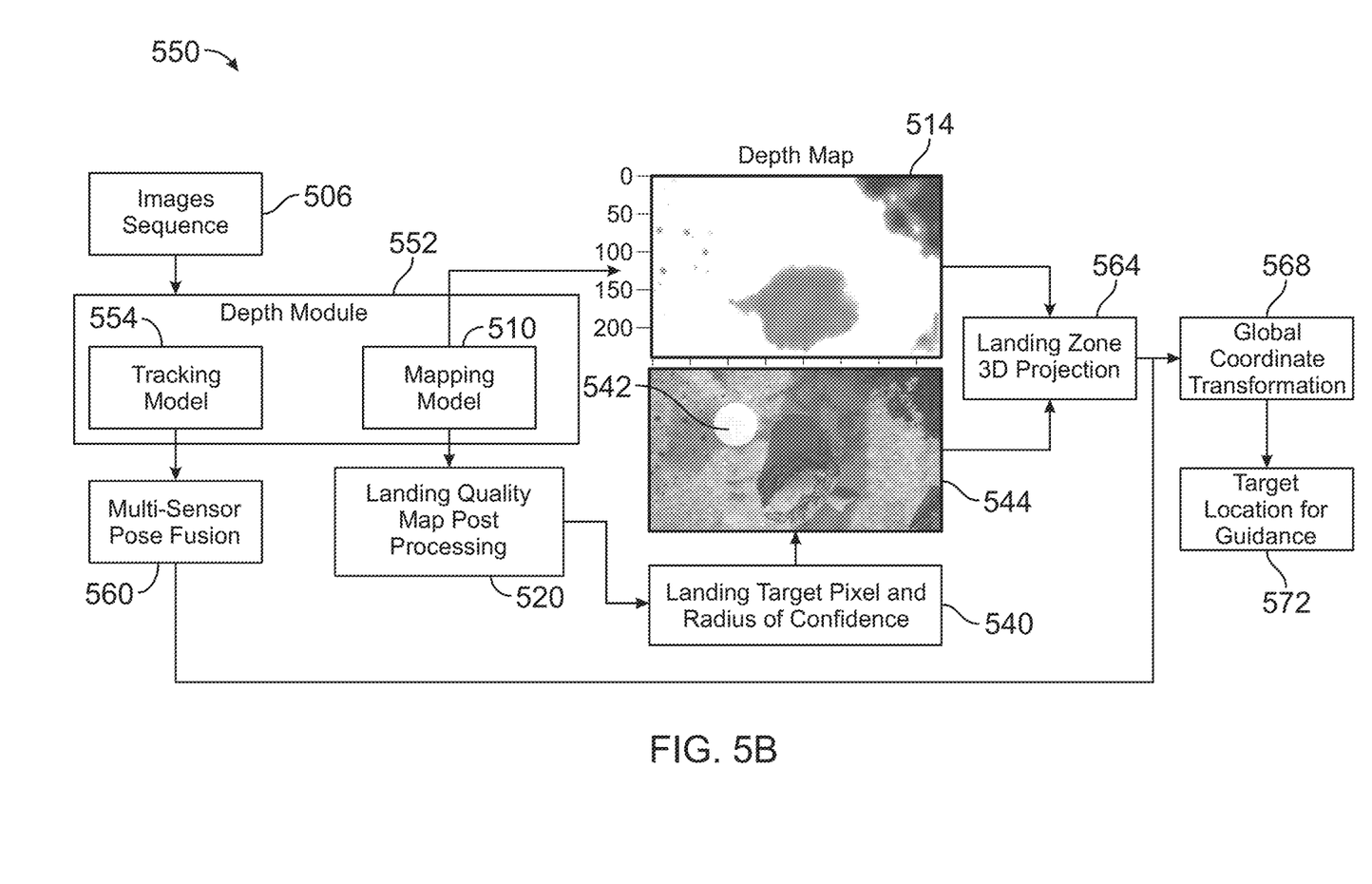
FIG. 5B is a flow diagram of an exemplary method for guidance processing, which is used in conjunction with the post processing method of FIG. 5A.

FIG. 5A is a flow diagram of an exemplary post processing method 500, illustrating various aspects of how a safe landing zone identification is performed. FIG. 5B is a flow diagram of an exemplary guidance processing method 550, which can be used in conjunction with post processing method 500 of FIG. 5A.

In post processing method 500, a set of images 504, captured by a camera mounted on the vehicle, are sent to an images sequence buffer 506. Information about the images is sent to a mapping model 510 that is configured to generate a landing quality map 514, which is a pixelwise heatmap of landing zone quality. This heatmap is generated by a neural network that combines depth and semantic information to generate a landing zone quality for each pixel in the image of the heatmap.

The post processing method 500 then performs thresholding (block 522) of the heatmap from mapping model 510, to generate a binary mask 524 based on a threshold value. The thresholding can provide blurring as a preconditioning step before generating binary mask 524. The threshold value is selected based on "safe" landing quality margins.

Next, post processing method 500 performs connected component labelling (CCL) (block 526) of binary mask 524 to produce a binary mask with CCL 528. The binary mask contains pixels with good landing quality and with bad landing quality. Pixels with bad landing quality are clustered using a connected component labelling strategy. These clustered pixels are called blobs.

The post processing method 500 then performs a distance transform (block 530), to produce a landing zone distance map 532 based on the binary mask with CCL. The image with blobs (bad landing quality pixels) and the background (good landing quality pixels) are transformed such as by using a Euclidean distance transform function, or other standard methods for distance transform. The distance transform assigns a distance value to each background pixel from the nearest blob pixel.

Thereafter, post processing method 500 selects a landing target pixel and radius of confidence (block 540), based on the landing zone distance map produced by the distance transform. The pixel on the landing zone distance map with the maximum distance is selected as the landing target pixel, and the distance value is the radius of confidence of the landing region in pixels. An example of the landing target pixel and radius of confidence is shown as a landing spot 542 in a zone selection image 544. The landing target pixel is further processed as described with respect to FIG. 5B, to determine a landing spot location.

As shown in FIG. 5B, guidance processing method 550 is carried out in conjunction with post processing method 500. As described above, the images captured by the camera on the vehicle are sent to images sequence buffer 506. Information about the images is sent from image sequence buffer 506 to a depth module 552, which includes mapping model 510 (FIG. 5A) and a tracking model 554.

As described above, mapping model 510 is configured to generate a landing quality map 514, which is a pixelwise heatmap (depth map) of landing zone quality. Landing quality map post processing (block 520) is performed based on the information from mapping model 510 as described above for FIG. 5A (thresholding, connected component labelling, and distance transform). This produces the landing target pixel and radius of confidence (block 540), such as landing spot 542 in zone selection image 544.

The tracking model 554 is configured to provides image and pose information to mapping model 510, which in turn provides depth information back to tracking model 514. A multi-sensor pose fusion unit 560 is configured to receive pose information from tracking model 554. The multi-sensor pose fusion unit 560 is configured to estimate vehicle state data.

The guidance processing method 550 generates a landing zone three-dimensional (3D) projection (block 564) from landing quality map 514 and the landing target pixel such as in zone selection image 544. For example, the landing target pixel is projected onto a 3D coordinate frame centered at the camera using a camera projection model (such as Pinhole) and the depth estimated for that pixel by the neural network, to generate a 3D landing target. The 3D landing target is then transformed to a global coordinate frame (block 568) using vehicle state data estimated by multi-sensor pose fusion unit 560, to produce a target location for guidance (block 572).

The processing units and/or other computational devices used in the method and system described herein may be implemented using software, firmware, hardware, or appropriate combinations thereof. The processing unit and/or other computational devices may be supplemented by, or incorporated in, specially-designed application-specific integrated circuits (ASICs), field programmable gate arrays (FPGAs), or graphics processing units (GPUs). In some implementations, the processing unit and/or other computational devices may communicate through an additional transceiver with other computing devices outside of the navigation system, such as those associated with a management system or computing devices associated with other subsystems controlled by the management system. The processing unit and/or other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

EXAMPLE EMBODIMENTS

Example 1 includes a system comprising: at least one image-capture device onboard an aerial vehicle; and at least one processor onboard the aerial vehicle and operatively coupled to the at least one image-capture device, the at least one processor operative to execute instructions to perform a method that comprises: receive, from the image-capture device, two or more overlapping images of a landscape underneath the aerial vehicle; generate, based on the overlapping images, a landing zone heatmap of the landscape; identify, based on the landing zone heatmap, one or more regions of the landscape having one or more potential landing zones and obstacles; determine a location of a safe landing zone using a distance transform of the one or more regions of the landscape, wherein the location of the safe landing zone is in an area within one of the potential landing zones that is farthest from the obstacles; and storing the location of the safe landing zone in a database.

Example 2 includes the system of Example 1, wherein the at least one image-capture device comprises a machine vision camera configured to capture an image buffer of the overlapping images in real time.

Example 3 includes the system of Example 2, wherein the at least one processer is configured to host a deep neural network and one or more machine vision algorithms, wherein the deep neural network is configured to compute and generate the landing zone heatmap.

Example 4 includes the system of any of Examples 1-3, wherein the landing zone heatmap is processed to generate a binary mask based on a threshold value, wherein the binary mask is labeled to identify the one or more regions of the landscape having the one or more potential landing zones and obstacles.

Example 5 includes the system of Example 4, wherein the labeled binary mask is processed using the distance transform to produce a landing zone distance map showing the location of the safe landing zone, a landing target pixel and radius of confidence.

Example 6 includes the system of any of Examples 1-5, further comprising: a ground truth navigation source operatively coupled to the at least one image-capture device and the at least one processer; and an autopilot operatively coupled to the at least one processor, the autopilot configured to receive guidance commands and to control the aerial vehicle.

Example 7 includes the system of Example 6, wherein the ground truth navigation source comprises an onboard global navigation satellite system (GNSS)/inertial navigation system (INS) navigator.

Example 8 includes the system of any of Examples 1-7, wherein the aerial vehicle comprises an unmanned aerial vehicle (UAV), an urban air mobility (UAM) vehicle, or an unmanned aircraft system (UAS).

Example 9 includes a method comprising: receiving image information, based on a set of overlapping images captured by a camera mounted on an aerial vehicle, in an image sequence buffer; sending the image information to a processor that includes a mapping model, which generates a landing quality map for the aerial vehicle; generating a binary mask of the landing quality map based on a threshold value; performing connected component labelling (CCL) of the binary mask to produce a labeled binary mask; performing a distance transform of the labeled binary mask to produce a landing zone distance map; and selecting a landing target pixel and radius of confidence, based on the landing zone distance map.

Example 10 includes the method of Example 9, wherein the landing quality map comprises a pixelwise heatmap of landing zone quality, which is generated by a neural network in the processor that combines depth and semantic information to generate a landing zone quality for each pixel in an image of the heatmap.

Example 11 includes the method of any of Examples 9-10, wherein the landing quality map is blurred as a preconditioning step prior to generating the binary mask based on the threshold value.

Example 12 includes the method of any of Examples 9-11, wherein the labeled binary mask includes background pixels with acceptable landing quality, and clustered pixels with unacceptable landing quality; wherein the clustered pixels with unacceptable landing quality are clustered by the connected component labelling to produce blobs.

Example 13 includes the method of any of Examples 9-12, wherein the distance transform of the labeled binary mask is a Euclidean distance transform.

Example 14 includes the method of any of Examples 9-13, wherein the distance transform assigns a distance value to each background pixel from a nearest clustered pixel, wherein the background pixel with a maximum distance value is selected as the landing target pixel, and the maximum distance value is the radius of confidence of a landing region in pixels.

Example 15 includes the method of any of Examples 9-14, further comprising: sending the image information to a tracking model in the processor, the tracking model operatively coupled to the mapping model; sending pose information from the tracking model to a multi-sensor pose fusion unit that estimates vehicle state data; generating a landing zone three-dimensional (3D) projection from the landing quality map and the landing target pixel; transforming the landing zone 3D projection to a global coordinate frame using the vehicle state data estimated by the multi-sensor pose fusion unit to produce a landing target location for guidance of the aerial vehicle; and storing the landing target location in a database.

Example 16 includes the method of Example 15, wherein the landing zone 3D projection is generated by projecting the landing target pixel onto a 3D coordinate frame centered at the camera, using a camera projection model and a depth estimated for the landing target pixel by a neural network in the processor.

Example 17 includes the method of any of Examples 9-16, wherein the aerial vehicle comprises an unmanned aerial vehicle (UAV), an urban air mobility (UAM) vehicle, or an unmanned aircraft system (LAS).

Example 18 includes a system comprising: at least one machine vision camera onboard an aerial vehicle; at least one processor onboard the aerial vehicle and operatively coupled to the at least one machine vision camera, the at least one processor comprising: a depth module configured to receive, from the machine vision camera, image information corresponding to overlapping images of an area over which the aerial vehicle travels, the depth module including a tracking model and a mapping model operatively coupled to the tracking model; wherein the mapping model is configured to generate a pixelwise depth map and a landing quality pixel map; wherein the tracking model provides image and pose information to the mapping model, and the mapping model provides depth information to the tracking model; a multi-sensor pose fusion module configured to receive pose information from the tracking model, the multi-sensor pose fusion module operative to estimate vehicle state data including vehicle orientation; and a post processing module operatively coupled to the depth module and the multi-sensor pose fusion module, the post processing module configured to calculate one or more potential landing regions in the landing quality pixel map, wherein the one or more potential landing regions is projected in three dimensions using a camera projection matrix and the pixelwise depth map to detect locations of the one or more potential landing regions; an onboard landing region database operatively coupled to the post processing module and the multi-sensor pose fusion module, the landing region database configured to store the locations of the one or more potential landing regions for a future emergency; an onboard landing zone tracker operatively coupled to the post processing module, the landing zone tracker configured to receive the locations of the one or more potential landing regions for use in real time; and an onboard guidance module operatively coupled to the landing region database and the landing zone tracker, the guidance module operative to send a request to the landing region database for a landing region candidate, wherein a best landing region candidate is sent from the landing region database to the guidance module.

Example 19 includes the system of Example 18, further comprising: an onboard autopilot operatively coupled to the multi-sensor pose fusion module and the guidance module, the autopilot configured to receive guidance commands, including landing target information, from the guidance module; wherein the autopilot is configured to send command signals, including an emergency signal, to an onboard supervisor module, which is operative to send an initiate land command to the guidance module; wherein the autopilot is configured to send pose signals to the multi-sensor pose fusion module.

Example 20 includes the system of any of Examples 18-19, further comprising: an onboard global navigation satellite system (GNSS)/inertial navigation system (INS) navigator, wherein the GNSS/INS navigator is operatively coupled to the at least one machine vision camera and the at least one processor; wherein the locations of the one or more potential landing regions are also detected based on navigation data from the GNSS/INS navigator.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A system comprising:
   at least one image-capture device onboard an aerial vehicle; and
   at least one processor onboard the aerial vehicle and operatively coupled to the at least one image-capture device, at least one processor operative to execute instructions to perform a method that comprises:
   receive, from the image-capture device, two or more overlapping images of a landscape underneath the aerial vehicle;
   generate, based on the overlapping images, a landing zone heatmap of the landscape, wherein the landing zone heatmap is processed to generate a binary mask based on a threshold value, wherein the binary mask contains pixels with good landing quality and pixels with bad landing quality, and the pixels with bad landing quality are clustered using connected component labelling (CCL) to produce a labeled binary mask;
   identify, based on the landing zone heatmap, one or more regions of the landscape having one or more potential landing zones and obstacles;
   determine a location of a safe landing zone using a distance transform of the one or more regions of the landscape, wherein the location of the safe landing zone is in an area within one of the potential landing zones that is farthest from the obstacles; and
   storing the location of the safe landing zone in a database.

2. The system of claim 1, wherein the at least one image-capture device comprises a machine vision camera configured to capture an image buffer of the overlapping images in real time.

3. The system of claim 2, wherein the at least one processor is configured to host a deep neural network and one or more machine vision algorithms, wherein the deep neural network is configured to compute and generate the landing zone heatmap.

4. The system of claim 2, wherein the labeled binary mask identifies the one or more regions of the landscape having the one or more potential landing zones and obstacles.

5. The system of claim 4, wherein the labeled binary mask is processed using the distance transform to produce a landing zone distance map showing the location of the safe landing zone, a landing target pixel and radius of confidence.

6. The system of claim 1, further comprising:
a ground truth navigation source operatively coupled to the at least one image-capture device and the at least one processer; and
an autopilot operatively coupled to the at least one processor, the autopilot configured to receive guidance commands and to control the aerial vehicle.

7. The system of claim 6, wherein the ground truth navigation source comprises an onboard global navigation satellite system (GNSS)/inertial navigation system (INS) navigator.

8. The system of claim 1, wherein the aerial vehicle comprises an unmanned aerial vehicle (UAV), an urban air mobility (UAM) vehicle, or an unmanned aircraft system WAS).

9. A method comprising:
receiving image information, based on a set of overlapping images captured by a camera mounted on an aerial vehicle, in an image sequence buffer;
sending the image information to a processor that includes a mapping model, which generates a landing quality map for the aerial vehicle;
generating a binary mask of the landing quality map based on a threshold value;
performing connected component labelling (CCL) of the binary mask to produce a labeled binary mask;
performing a distance transform of the labeled binary mask to produce a landing zone distance map; and
selecting a landing target pixel and radius of confidence, based on the landing zone distance map.

10. The method of claim 9, wherein the landing quality map comprises a pixelwise heatmap of landing zone quality, which is generated by a neural network in the processor that combines depth and semantic information to generate a landing zone quality for each pixel in an image of the heatmap.

11. The method of claim 9, wherein the landing quality map is blurred as a preconditioning step prior to generating the binary mask based on the threshold value.

12. The method of claim 11, wherein the labeled binary mask includes background pixels with acceptable landing quality, and clustered pixels with unacceptable landing quality;
wherein the clustered pixels with unacceptable landing quality are clustered by the connected component labelling to produce blobs.

13. The method of claim 12, wherein the distance transform of the labeled binary mask is a Euclidean distance transform.

14. The method of claim 12, wherein the distance transform assigns a distance value to each background pixel from a nearest clustered pixel, wherein the background pixel with a maximum distance value is selected as the landing target pixel, and the maximum distance value is the radius of confidence of a landing region in pixels.

15. The method of claim 9, further comprising:
sending the image information to a tracking model in the processor, the tracking model operatively coupled to the mapping model;
sending pose information from the tracking model to a multi-sensor pose fusion unit that estimates vehicle state data;
generating a landing zone three-dimensional (3D) projection from the landing quality map and the landing target pixel;
transforming the landing zone 3D projection to a global coordinate frame using the vehicle state data estimated by the multi-sensor pose fusion unit to produce a landing target location for guidance of the aerial vehicle; and
storing the landing target location in a database.

16. The method of claim 15, wherein the landing zone 3D projection is generated by projecting the landing target pixel onto a 3D coordinate frame centered at the camera, using a camera projection model and a depth estimated for the landing target pixel by a neural network in the processor.

17. The method of claim 9, wherein the aerial vehicle comprises an unmanned aerial vehicle (UAV), an urban air mobility (UAM) vehicle, or an unmanned aircraft system (UAS).

18. A system comprising:
at least one machine vision camera onboard an aerial vehicle;
at least one processor onboard the aerial vehicle and operatively coupled to the at least one machine vision camera, the at least one processor comprising:
a depth module configured to receive, from the machine vision camera, image information corresponding to overlapping images of an area over which the aerial vehicle travels, the depth module including a tracking model and a mapping model operatively coupled to the tracking model;
wherein the mapping model is configured to generate a pixelwise depth map and a landing quality pixel map;
wherein the tracking model provides image and pose information to the mapping model, and the mapping model provides depth information to the tracking model;
a multi-sensor pose fusion module configured to receive pose information from the tracking model, the multi-sensor pose fusion module operative to estimate vehicle state data including vehicle orientation; and
a post processing module operatively coupled to the depth module and the multi-sensor pose fusion module, the post processing module configured to calculate one or more potential landing regions in the landing quality pixel map, wherein the one or more potential landing regions is projected in three dimensions using a camera projection matrix and the pixelwise depth map to detect locations of the one or more potential landing regions;
an onboard landing region database operatively coupled to the post processing module and the multi-sensor pose fusion module, the landing region database configured to store the locations of the one or more potential landing regions for a future emergency;
an onboard landing zone tracker operatively coupled to the post processing module, the landing zone tracker configured to receive the locations of the one or more potential landing regions for use in real time; and an onboard guidance module operatively coupled to the landing region database and the landing zone tracker, the guidance module operative to send a request to the landing region database for a landing region candidate, wherein a best landing region candidate is sent from the landing region database to the guidance module.

19. The system of claim 18, further comprising:
an onboard autopilot operatively coupled to the multi-sensor pose fusion module and the guidance module, the autopilot configured to receive guidance commands, including landing target information, from the guidance module;
wherein the autopilot is configured to send command signals, including an emergency signal, to an onboard supervisor module, which is operative to send an initiate land command to the guidance module;
wherein the autopilot is configured to send pose signals to the multi-sensor pose fusion module.

20. The system of claim 18, further comprising:
an onboard global navigation satellite system (GNSS)/inertial navigation system (INS) navigator, wherein the GNSS/INS navigator is operatively coupled to the at least one machine vision camera and the at least one processor;
wherein the locations of the one or more potential landing regions are also detected based on navigation data from the GNSS/INS navigator.

* * * * *